(12) United States Patent
Bhogal et al.

(10) Patent No.: US 7,979,547 B2
(45) Date of Patent: Jul. 12, 2011

(54) METHOD AND SYSTEM FOR SPLITTING A BANDWIDTH AMONG A PLURALITY OF NETWORK TRANSACTIONS

(75) Inventors: Kulvir S. Bhogal, Fort Worth, TX (US); Nizamudeen Ishmael, Jr., Austin, TX (US); Javid Jameossanaie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3245 days.

(21) Appl. No.: 10/062,328

(22) Filed: Jan. 31, 2002

(65) Prior Publication Data
US 2003/0145088 A1     Jul. 31, 2003

(51) Int. Cl.
*G06F 15/16* (2006.01)
(52) U.S. Cl. .................... 709/226; 709/207; 370/321

(58) Field of Classification Search ................. 709/226, 709/207; 370/231
See application file for complete search history.

(56) References Cited

U.S. PATENT DOCUMENTS

| 4,445,116 | A | 4/1984 | Grow |
| 5,315,586 | A | 5/1994 | Charvillat |
| 5,850,398 | A | 12/1998 | King, Jr. |
| 5,982,748 | A | 11/1999 | Yin et al. |
| 6,014,701 | A | 1/2000 | Chaddha |
| 6,256,669 | B1 | 7/2001 | Hurwitz |
| 6,628,615 | B1 * | 9/2003 | Joseph et al. .............. 370/231 |
| 2003/0110229 | A1 * | 6/2003 | Kulig et al. ................ 709/207 |

* cited by examiner

*Primary Examiner* — Tammy T Nguyen
(74) *Attorney, Agent, or Firm* — DeLizio Gilliam, PLLC (57) ABSTRACT

The invention provides a method of splitting bandwidth among a plurality of network transactions. First, a communication requesting a priority for a network transaction is displayed. Second, an input indicating the priority of the bandwidth is received.

18 Claims, 6 Drawing Sheets

METHOD AND SYSTEM FOR SPLITTING A BANDWIDTH AMONG A PLURALITY OF NETWORK TRANSACTIONS

FIELD OF THE INVENTION

In general, the present invention relates to network connections of communication devices. More specifically, the present invention relates to application programs of a communication device conducting network transactions within a network, and in particular, to a method for splitting a bandwidth among the network transactions.

BACKGROUND OF THE INVENTION

A user of a communication device can simultaneously perform various network transactions while connected to the Internet via a network. Examples of such communication devices are a personal computer, a workstation, a laptop computer, a personal data assistant, and a mobile phone. Examples of such network transactions are a download and storage of data, an upload of data, and a browsing of one or more web pages.

Currently, an operating system of a communication device processes each network transaction on a first come, first serve basis. As a result, the operating system may allocate a transmission capacity, i.e., bandwidth, of the communication device to a network transaction of a highest priority as deemed by the user after an allocation of the bandwidth to another network transaction of a lower priority as deemed by the user. Consequently, the network transaction of the highest priority may not be completed in a time period that is satisfactory to the user. As such, the user of the communication device is typically required to close a network transaction having a lower priority in order to facilitate an earlier allocation of the bandwidth to the network transaction having the highest priority.

Upon completion of the network transaction having the highest priority, the user may reopen the previously closed online network transaction. However, a closing and reopening of the network transaction having a low priority increases the overall time the user must spend on the communication device. Such an increase can be significant when the number of network transactions to be performed is significant and/or the complexity of the network transactions is significant.

Thus, there is a significant need for a method for splitting the bandwidth among the network transactions so that the optimization of time and resources can be realized.

SUMMARY OF THE INVENTION

One aspect of the invention provides a method for splitting a bandwidth among a plurality of network transactions. First, a communication requesting a priority for a network transaction is displayed. Second, an input indicating the priority for the network transaction is received.

Another aspect of the invention provides a system for splitting a bandwidth among a plurality of network transactions. The system comprises means for displaying a communication requesting a priority for a network transaction, and means for receiving an input indicating the priority for the network transaction.

Another aspect of the invention provides a computer program product in a computer readable medium for splitting a bandwidth among a plurality of network transactions. The computer program product comprises computer readable code for displaying a communication requesting a priority for a network transaction, and computer readable code for receiving an input indicating the priority for the network transaction.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
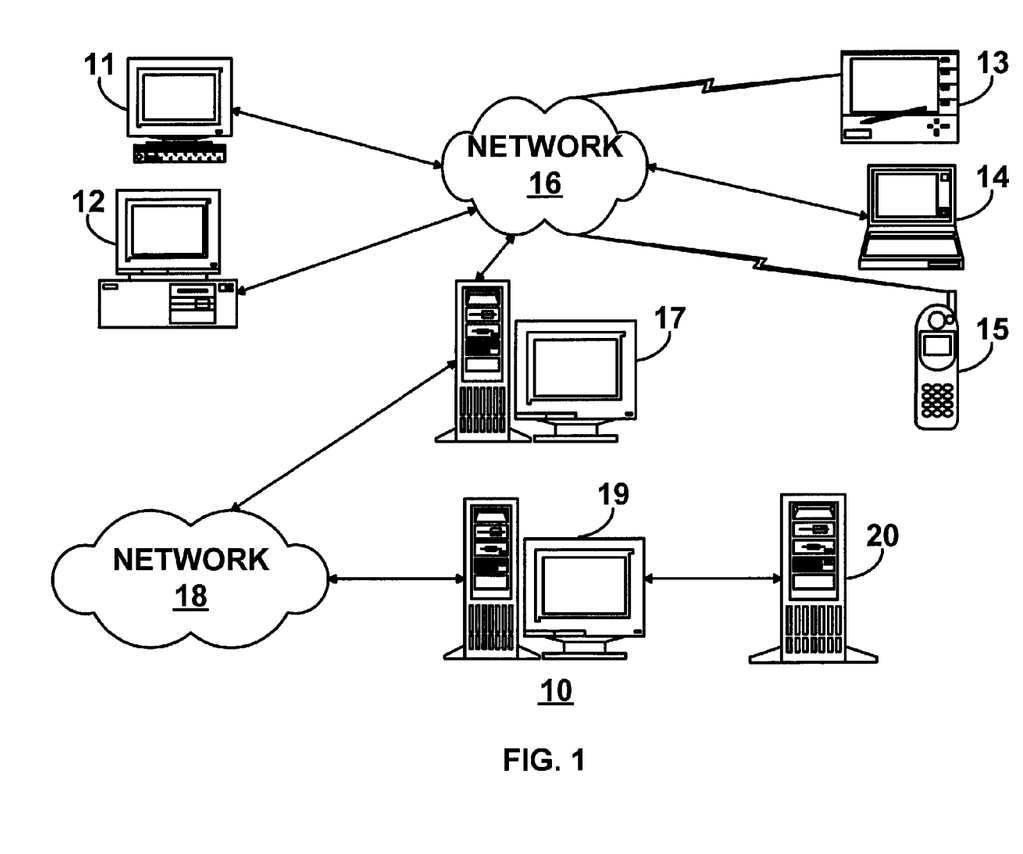
FIG. 1 is an overview diagram of a preferred embodiment of a network-based system in accordance with the present invention.

In FIG. 1, a network-based system 10 is illustrated in accordance with one embodiment of the present invention. As shown in FIG. 1, the system 10 may contain a plurality of communication devices in the form of a personal computer 11, a workstation 12, a personal data assistant 13, a laptop computer 14, and a mobile phone 15. Additional communication devices as shown as well as other types of communication devices may be employed in embodiments of the present invention alternative to the network-based system 10 as would occur to those having ordinary skill in the art.

The communication devices 11-15 have conventional communication links in the form of wire links and/or wireless links to a network server 17 via a network 16, such as, for example, an intranet, an extranet, a local area network, a wide area network, a public switched telephone network, and a private telephone network. In turn, network server 17 has a conventional communication link to a network server 19 via a network 18 such as, for example, an intranet, an extranet, a local area network, a wide area network, and a telephone network. In one embodiment, network server 17 constitutes an Internet service provider and network server 19 constitutes an Internet node having an application server 20. Additional networks, network servers, and application servers may be employed in embodiments of the present invention alternative to the network-based system 10.

Figure 2:
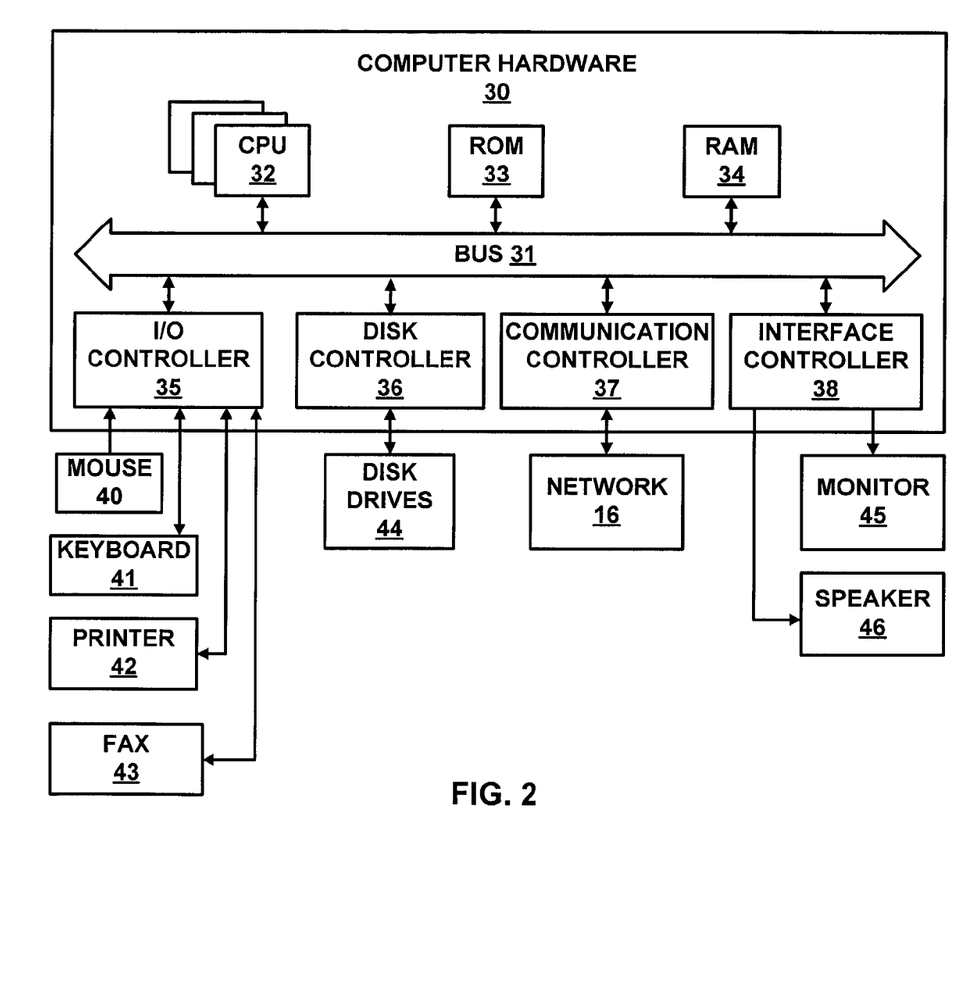
FIG. 2 is a block diagram illustrating a first embodiment of a communication device in accordance with the present invention.

The communication devices 11-14 may be configured in any form for accepting structured inputs, processing the inputs in accordance with prescribed rules, and outputting the processing results as would occur to those having ordinary skill in the art, such as, for example, an IBM personal computer, an Apple Macintosh, and a Hewlett-Packard workstation. In FIG. 2, computer hardware 30 of communication devices 11-14 is illustrated in accordance with one embodiment of the present invention. As shown in FIG. 2, computer hardware 30 includes a bus 31 for facilitating electrical communication among one or more central processing units (CPU) 32, a read-only memory (ROM) 33, a random access memory (RAM) 34, an input/output (I/O) controller 35, a disk controller 36, a communication controller 37, and a user interface controller 38.

Each CPU 32 is preferably one of the Intel families of microprocessors, one of the AMD families of microprocessors, one of the Motorola families of microprocessors, or one of the various versions of a Reduced Instruction Set Computer microprocessor such as the PowerPC chip manufactured by IBM. ROM 33 permanently stores various controlling programs such as the Basic Input-Output System (BIOS) developed by IBM. RAM 34 is the memory for loading an operating system and selectively loading the controlling programs.

Controller 35 is an aggregate of conventional controllers for facilitating an interaction between CPU 32 and pointing devices such as a mouse 40 and a keyboard 41, and between CPU 32 and output devices such as a printer 42 and a fax 43. Controller 36 is an aggregate of conventional controllers for facilitating an interaction between CPU 32 and storage devices such as disks drives 44 in the form of a hard drive, a floppy drive, and a compact-disc drive. The hard drive stores a conventional operating system, such as, for example, IBM's AIX operating system or Microsoft's Windows. Controller 37 is an aggregate of conventional controllers for facilitating an interaction between CPU 32 and network 16. Controller 38 is an aggregate of conventional controllers for facilitating an interaction between CPU 32 and a graphic display device such as a monitor 45, and between CPU 32 and an audio device such as a speaker 46.

Those having ordinary skill in the art will appreciate additional components that may be included within computer hardware 30 in accordance with the principles of the present invention. Those having ordinary skill in the art will also appreciate embodiments of the present invention alternative to computer hardware 30 for implementing the principles of the present invention.

Figure 3:
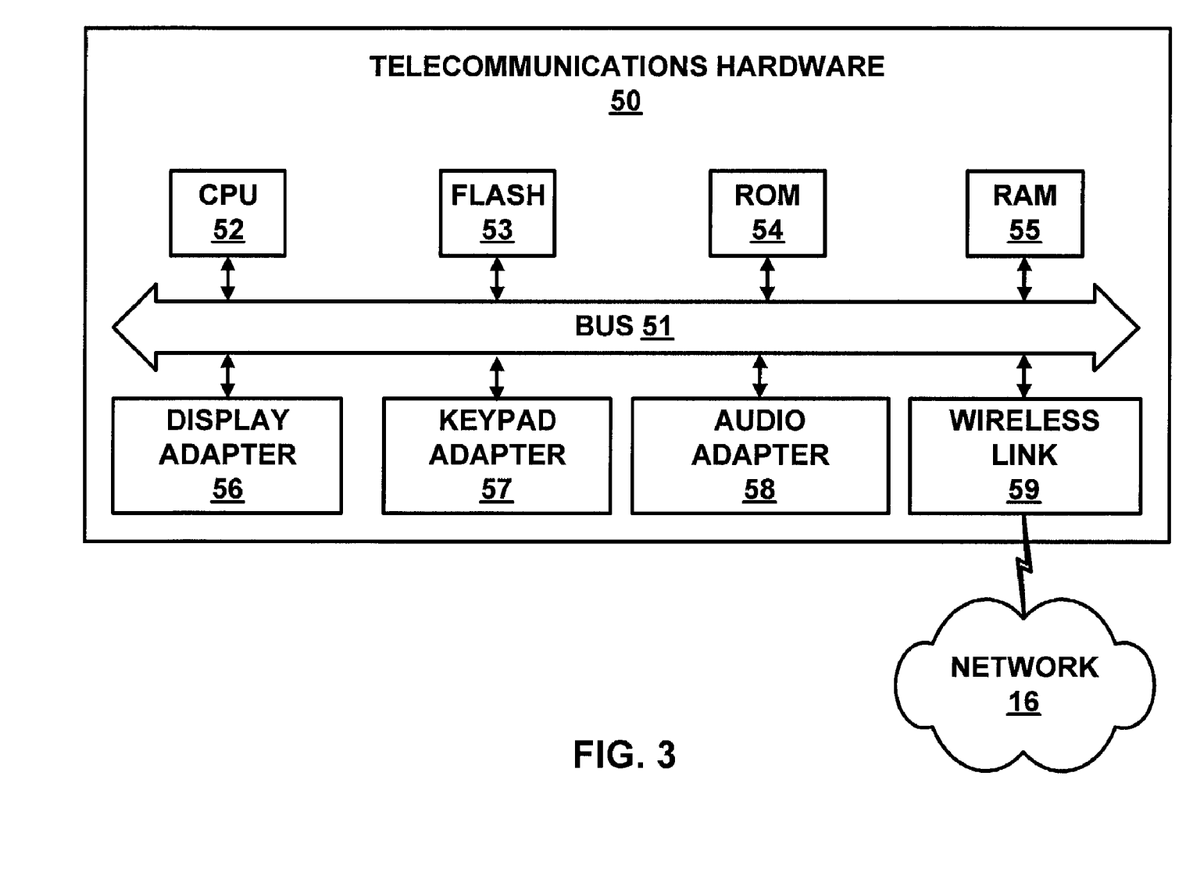
FIG. 3 is a block diagram illustrating a second embodiment of a communication device in accordance with the present invention.

The communication device 15 (FIG. 1) may be configured in any manner for executing telecommunication network transactions as would occur to those having ordinary skill in the art. In FIG. 3, telecommunications hardware 50 of communication device 15 is illustrated in accordance with one embodiment of the present invention. As shown in FIG. 3, telecommunications hardware 50 includes a bus 51 for facilitating electrical communication among a central processing unit (CPU) 52, a flash memory (FLASH) 53, a read-only memory 54, a random access memory (RAM) 55, a display adapter 56, a keypad adapter 57, an audio adapter 58, and a wireless link 59 including a transmitter (not shown), a receiver (not shown), and an antenna (not shown) for communicating with network 16.

As with each CPU 32 (FIG. 2), CPU 52 is preferably one of the Intel families of microprocessors, one of the AMD families of microprocessors, one of the Motorola families of microprocessors, or one of the various versions of a Reduced Instruction Set Computer microprocessor such as the PowerPC chip manufactured by IBM. FLASH 53 stores a conventional operating system, such as Windows CE or Palm OS, and application programs. ROM 54 stores various controlling programs such as the Basic Input-Output System (BIOS). RAM 55 is the memory for loading the operating system and selectively loading the controlling programs.

Those having ordinary skill in the art will appreciate additional components that may be included within telecommunication hardware 50 in accordance with the principles of the present invention. Those having ordinary skill in the art will also appreciate embodiments of the present invention alternative to telecommunication hardware 50 for implementing the principles of the present invention.

Figure 4:
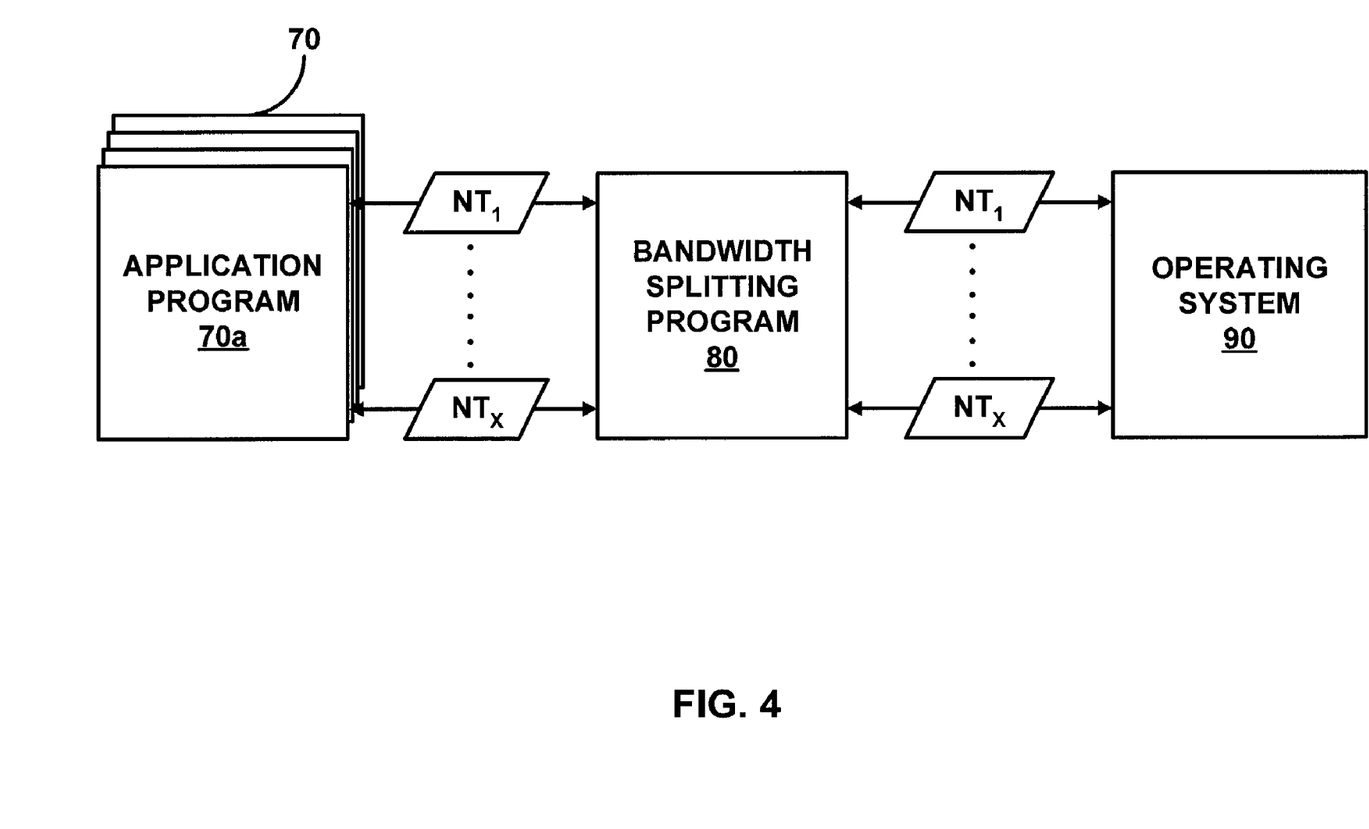
FIG. 4 is a block diagram illustrating a preferred embodiment of computer software installed within the FIG. 2 communication device and the FIG. 3 communication device in accordance with the present invention.

In FIG. 4, computer software pertinent to the present invention that is stored within the computer readable mediums of the communication devices 11-15 (FIG. 1) is shown. The computer software includes a plurality of application programs 70 such as application program 70a, an operating system 90, and a bandwidth splitting program 80 for splitting a bandwidth of communication devices 11-15 among a plurality of network transactions $NT_1$-$NT_x$. Specifically, the bandwidth splitting program 80 continually decides which single network transaction of network transactions $NT_1$-$NT_x$ is to be transmitted to the operating system 80 whereby the single network transaction transmitted to the operating system 90 can be processed to upload and/or download data in accordance with the bandwidth. The bandwidth splitting program 80 bases the decision of which single network transaction to transmit to the operating system 90 in response to a priority assigned to each network transaction by a user of communication devices 11-15.

Figure 5:
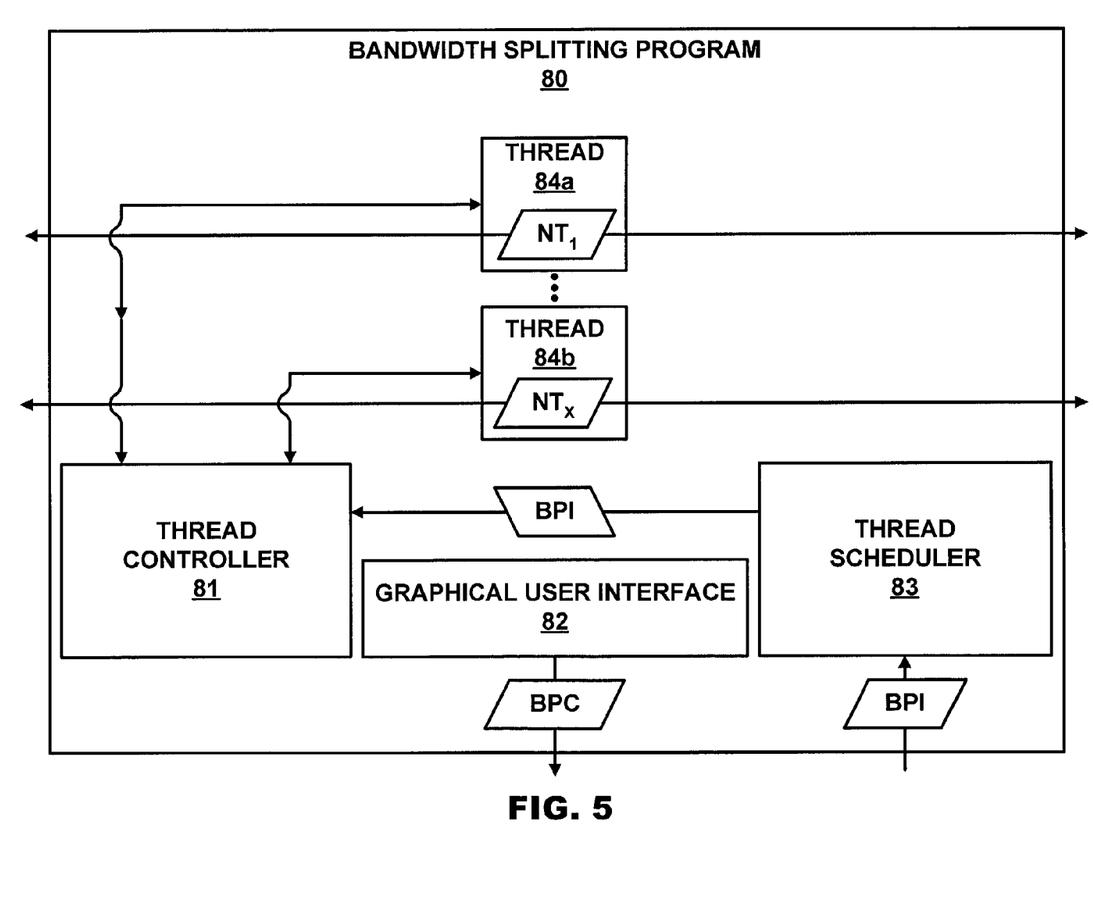
FIG. 5 is a block diagram illustrating a preferred embodiment of bandwidth splitting program of the computer software of FIG. 4 in accordance with the present invention.

In FIG. 5, a preferred embodiment of the bandwidth splitting program 80 is shown. In one embodiment, the bandwidth splitting program 80 is written in JAVA. The bandwidth splitting program 80 includes software modules in the form of a thread controller 81, a graphical user interface 82, and a thread scheduler 83 which collectively implement a method for splitting the bandwidth among the network transactions $NT_1$-$NT_x$ of the present invention as represented by a flowchart 100 illustrated in FIG. 6. The thread controller 81 monitors each port address during a stage S102 of flowchart 100 whereby the thread controller 81 can determine if one of the application programs 70 is initiating a new network transaction during a stage S104 of flowchart 100. The following TABLE 1 is an exemplary listing of port addresses and corresponding Internet services:

TABLE 1

| Port Addresses | Internet Services |
|---|---|
| 80 (TCP) | HyperText Transport Protocol (HTTP) |
| 443 (TCP) | HyperText Transport Protocol Secure (HTTPS) |
| 25 (TCP) | Simple Mail Transfer Protocol (SMTP) |
| 110 (TCP) | Post Office Protocol Version 3 (POP3) |
| 20-21 (TCP) | File Transfer Protocol (FTP) |
| 23 (TCP) | Telnet |
| 1090 (TCP) | RealAudio |
| 4000 (UDP) | "I Seek You" (ICQ) |
| 119 (TCP) | News Servers |
| 53 (UDP) | Domain Naming Servers (DNS) |
| 6667 (TCP) | IRC |
| 7000 (TCP) | VDOLIVE |

In NTBLE 1, TCP is an abbreviation for Transmission Control Protocol, and UDP is an abbreviation for User Diagram Protocol.

Figure 6:
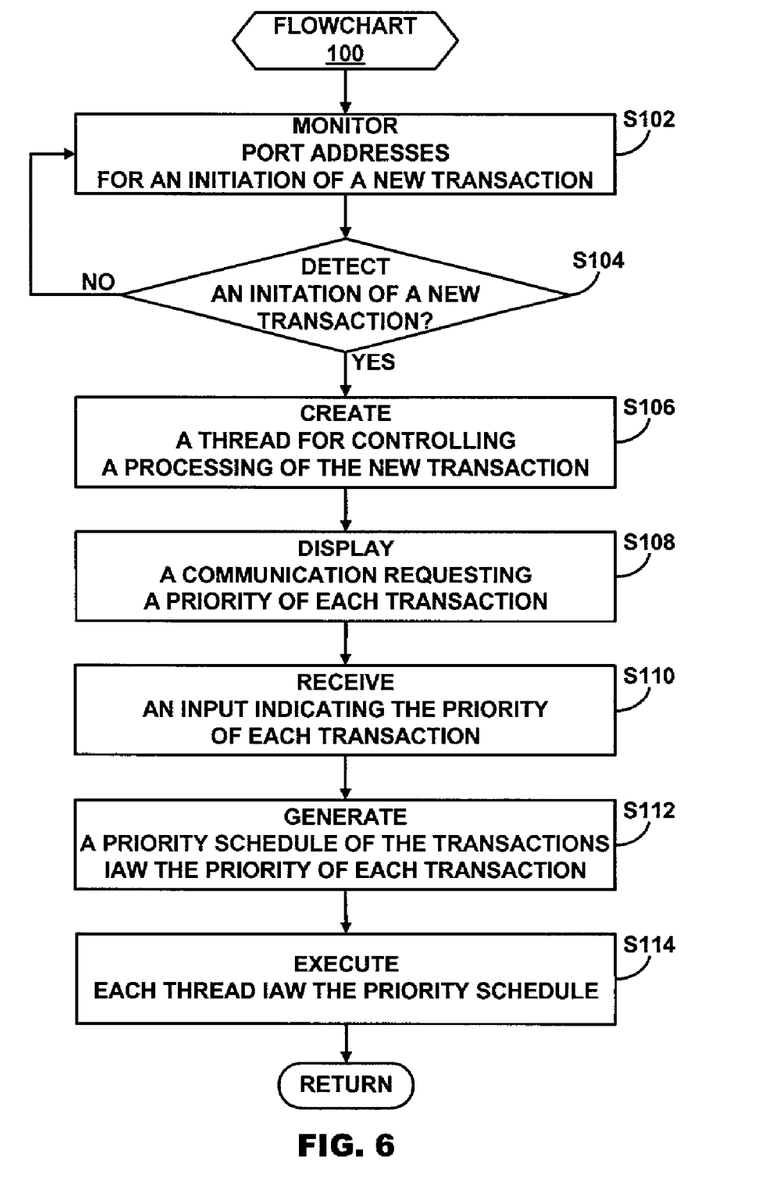
FIG. 6 is a flow chart representation of a method for splitting the bandwidth among a plurality of network transactions in accordance with the present invention.

The thread controller 81 remains in a loop consisting of the stage S102 and the stage S104 until the thread controller 81 detects an initiation of the new network transaction. In response to a detection of the new network transaction by the thread controller 81, the thread controller 81 creates a thread for controlling a processing of the new network transaction during as stage S106 of flowchart 100. A thread is a single sequential flow of control within the bandwidth splitting program 80. The thread created by the thread controller 81 transmits the data request associated with the new network transaction to the operating system 90 when the thread is given priority by the thread controller 81. Upon receipt of the data request, the operating system 90 can process the new network transaction in accordance with the corresponding port address to thereby grant or deny an upload and/or a download of data via the network 16 (FIG. 1) in accordance with the data request.

The graphical user interface 82 displays a bandwidth priority communication BPC requesting a priority of each network transaction during a stage S108 of the flowchart 100. The communication can be in one of various forms. A first form of the bandwidth priority communication BPC is a request for a preferred percentage of the total bandwidth to be applied to each network transaction $NT_1$-$NT_x$. A second form of the bandwidth priority communication BPC is a request for a ranking of the each network transaction $NT_1$-$NT_x$. A third form of the bandwidth priority communication BPC is a request for a rating of each $NT_1$-$NT_x$ in a numeric format extending from a maximum value to a minimum value or in a degree format extending from a high level to a low level.

The thread scheduler 83 receives a bandwidth priority input BPI indicating the priority of each network transaction during a stage S110 of flowchart 100, and in response thereto, during a stage S112 of the flowchart 100, generates a bandwidth priority schedule BPS indicating a priority of each thread created by the thread controller 81 as indicated by bandwidth priority input BPI. The thread controller 81 thereafter executes each thread in accordance with the bandwidth priority schedule BPS during a stage S114 of the flowchart 100.

An exemplary implementation of the flowchart 100 will now be described herein. At a time $T_1$, a download of a text file, an upload of an audio file, and an e-mail transmission are among the network transactions $NT_1$-$NT_x$ by the application programs 70. The thread controller 81 is providing priority to the threads corresponding to the text file, the audio file and the e-mail in accordance with an existing bandwidth priority schedule. Thus, each network transaction is being processed by the operating system 90 as priority is given to each thread.

At a time $T_2$, one of the application programs 70 initiates a Telnet session as a new network transaction. Upon a detection of the Telnet session by the thread controller 81 from a monitoring of the port addresses, the thread controller 81 creates a thread fro the Telnet session and the graphical user interface 82 displays the bandwidth priority communication BPC requesting a priority of each network transaction. The thread scheduler 83 receives a bandwidth priority input BPI indicating the priority of the text file, the audio file, the e-mail and the Telnet session. In response thereto, the thread scheduler 83 generates a new bandwidth priority schedule BPS indicating a priority of each thread created by the thread controller 81 as indicated by bandwidth priority input BPI. The thread controller 81 thereafter executes each thread in accordance with the bandwidth priority schedule BPS whereby, in effect, the operating system 90 splits the bandwidth among the downloading of the text file, the uploading of the audio file, the e-mail transmission, and the Telnet session.

The above-described methods and implementation of encoding and decoding media sequences are example methods and implementations. These methods and implementations illustrate one possible approach for encoding and decoding media sequences. The actual implementation may vary from the method discussed. Moreover, various other improvements and modifications to this invention may occur to those skilled in the art, and those improvements and modifications will fall within the scope of this invention as set forth below.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for splitting a bandwidth among a plurality of network transactions, said method comprising:
   displaying a communication requesting a priority of a network transaction; and
   receiving an input indicating the priority of the network transaction.

2. The method of claim 1, further comprising:
   monitoring a port address for an initiation of the network transaction.

3. The method of claim 2, further comprising:
   detecting an initiation of the network transaction,
      wherein the communication is displayed subsequent to a detection of the initiation of the network transaction.

4. The method of claim 3, further comprising:
   creating a thread for controlling a processing of the network transaction in response to a detection of the initiation of the network transaction.

5. The method of claim 4, further comprising:
   generating a priority schedule based upon the priority corresponding to the network transaction as indicated by the input.

6. The method of claim 5, further comprising:
   executing the thread to control the processing of the network transaction in accordance with the priority schedule.

7. A system for splitting a bandwidth among a plurality of network transactions, said system comprising:
   means for displaying a communication requesting a priority of a network transaction; and
   means for receiving an input indicating the priority of the network transaction.

8. The system of claim 7, further comprising:
   means for monitoring a port address for an initiation of the network transaction.

9. The system of claim 8, further comprising:
   means for detecting an initiation of the network transaction,
      wherein the communication is displayed subsequent to a detection of the initiation of the network transaction.

10. The system of claim 9, further comprising:
    means for creating a thread for controlling a processing of the network transaction in response to a detection of the initiation of the network transaction.

11. The system of claim 10, further comprising:
    means for generating a priority schedule based upon the priority corresponding to the network transaction as indicated by the input.

12. The system of claim 11, further comprising:
    means for executing the thread to control the processing of the network transaction in accordance with the priority schedule.

13. A computer program product in a computer readable medium for splitting a bandwidth among a plurality of network transactions, said computer program product comprising:

computer readable code for displaying a communication requesting a priority of a network transaction; and computer readable code for receiving an input indicating the priority of the network transaction.

14. The computer program product of claim 13, further comprising:

computer readable code for monitoring a port address for an initiation of the network transaction.

15. The computer program product of claim 14, further comprising:

computer readable code for detecting an initiation of the network transaction, wherein the communication is displayed subsequent to a detection of the initiation of the network transaction.

16. The computer program product of claim 15, further comprising:

computer readable code for creating a thread for controlling a processing of the network transaction in response to a detection of the initiation of the network transaction.

17. The computer readable code of claim 16, further comprising: computer readable code for generating a priority schedule based upon the priority corresponding to the network transaction as indicated by the input.

18. The method of claim 17, further comprising:

computer readable code for executing the thread to control the processing of the network transaction in accordance with the priority schedule.

* * * * *